(12) United States Patent
Soga et al.

(10) Patent No.: US 11,554,692 B2
(45) Date of Patent: Jan. 17, 2023

(54) SEAT SLIDE DEVICE

(71) Applicant: TF-METAL Co., Ltd., Kosai (JP)

(72) Inventors: Takuji Soga, Hamamatsu (JP);
Tomoyasu Ito, Hamamatsu (JP)

(73) Assignee: TF-METAL Co., Ltd., Kosai (JP)

( * ) Notice: Subject to any disclaimer, the term of this patent is extended or adjusted under 35 U.S.C. 154(b) by 0 days.

(21) Appl. No.: 17/144,382

(22) Filed: Jan. 8, 2021

(65) Prior Publication Data

US 2021/0229575 A1 Jul. 29, 2021

(30) Foreign Application Priority Data

Jan. 23, 2020 (JP) ............................. JP2020-008831

(51) Int. Cl.
*B60N 2/07* (2006.01)

(52) U.S. Cl.
CPC ........... *B60N 2/073* (2013.01); *B60N 2/0715* (2013.01); *B60N 2/0732* (2013.01)

(58) Field of Classification Search
CPC .... B60N 2/0715; B60N 2/0725; B60N 2/073; B60N 2/0732; B60N 2/0735
See application file for complete search history.

(56) References Cited

U.S. PATENT DOCUMENTS

| | | | | |
|---|---|---|---|---|
| 4,892,282 A * | 1/1990 | Suzuki | ................. | B60N 2/0705 248/430 |
| 5,370,350 A * | 12/1994 | Okano | ................. | B60N 2/0705 248/420 |
| 7,669,826 B2 * | 3/2010 | Hayakawa | ........... | B60N 2/0705 248/430 |
| 7,992,834 B2 * | 8/2011 | Kojima | ................ | B60N 2/0727 248/429 |
| 8,490,941 B2 * | 7/2013 | Mizuno | ................ | B60N 2/0725 248/429 |
| 8,925,889 B2 * | 1/2015 | Nagura | ................ | B60N 2/0875 248/429 |

(Continued)

FOREIGN PATENT DOCUMENTS

| | | | | |
|---|---|---|---|---|
| DE | 4105231 A1 * | 9/1992 | ........... | B60N 2/0725 |
| FR | 2746721 A1 * | 10/1997 | ........... | B60N 2/0705 |

(Continued)

OTHER PUBLICATIONS

Chinese Office Action in Application No. 202110086467.2, dated Sep. 27, 2022 with English translation.

*Primary Examiner* — Jonathan Liu
*Assistant Examiner* — Guang H Guan
(74) *Attorney, Agent, or Firm* — Foley & Lardner LLP

(57) ABSTRACT

A seat slide device includes a reinforcing member attached to a rear end part of an upper rail. The reinforcing member is higher in rigidity than the upper rail. The reinforcing member includes a reinforcing member body having a U-shaped cross section having a lower opening, and including a reinforcing member top wall; a pair of reinforcing member lateral walls; and a pair of reinforcing member bent wall parts each being bent outwardly from a lower end of a corresponding one of the reinforcing member lateral walls in a lateral direction of the reinforcing member, and extending upwardly between a corresponding lower rail outside lateral wall and a corresponding lower rail inside lateral wall.

7 Claims, 13 Drawing Sheets

(56) References Cited

U.S. PATENT DOCUMENTS

| | | | | |
|---|---|---|---|---|
| 9,469,217 B2* | 10/2016 | Hayashi | ............... | B60N 2/0732 |
| 9,616,777 B2* | 4/2017 | Arakawa | .............. | B60N 2/0732 |
| 9,751,431 B2* | 9/2017 | Walter | ................. | B60N 2/0715 |
| 10,118,506 B2 | 11/2018 | Hattori et al. | | |
| 10,399,464 B2* | 9/2019 | Quast | ................... | B60N 2/0725 |
| 10,414,300 B2 | 9/2019 | Sato et al. | | |
| 10,752,131 B2* | 8/2020 | Tsuji | .................... | B60N 2/0725 |
| 10,919,414 B2* | 2/2021 | Tsuji | .................... | B60N 2/0722 |
| 10,940,775 B2* | 3/2021 | Tamaki | ................. | B60N 2/085 |
| 11,065,987 B2* | 7/2021 | Koizumi | ............. | B60N 2/0727 |
| 11,180,053 B2* | 11/2021 | Quast | ................... | B60N 2/0725 |
| 2021/0229575 A1* | 7/2021 | Soga | .................... | B60N 2/0732 |

FOREIGN PATENT DOCUMENTS

| | | | |
|---|---|---|---|
| JP | 2001-239861 A | | 9/2001 |
| JP | 2017-035910 A | | 2/2017 |
| JP | 2017-121905 A | | 7/2017 |
| JP | 2018-203075 A | | 12/2018 |
| JP | 2019-163022 A | | 9/2019 |

\* cited by examiner

SEAT SLIDE DEVICE

BACKGROUND

The present Invention relates to a seat slide device.

Japanese Patent Application Publication No. 2017-121905 (JP 2017-121905 A), corresponding to U.S. Pat. No. 10,118,506 (U.S. Pat. No. 10,118,506 B2), discloses a slide rail in which an upper rail is slidably mounted to a lower rail, wherein a seat is fixed to the upper rail, and wherein the lower rail Is fixed to a floor of a vehicle. In the slide rail, a buckle is fixed to a rear end part of the upper rail via an anchor bracket, wherein the buckle is structured to be coupled with a tongue plate of a seat belt. When a shock is inputted into such a slide rail to act forward in a vehicle longitudinal direction, a large load in a diagonally forward and upward direction of the vehicle is applied to the upper rail via the buckle coupled with the seat belt. This load acts so as to deform the upper rail so that the rear end part of the upper rail is raised with respect to the lower rail. In view of the foregoing, the slide rail according to JP 2017-121905 A is structured such that a lower-side J hook fixed to a rear end part of the lower rail is engaged with an upper-side J hook fixed to the rear end part of the upper rail so as to suppress the upper rail from being deformed and detached from the lower rail.

SUMMARY

In the slide rail according to JP 2017-121905 A, in order to allow the lower-side J hook to be constantly engaged with the upper-side J hook over a range of possible slide of the upper rail with respect to the lower rail, the upper-side J hook and the lower-side J hook are required to be sufficiently large, which may cause upsizing of the slide rail.

In view of the foregoing, it is desirable to provide a seat slide device in which resistance against detachment between an upper rail and a lower rail is enhanced without upsizing.

According to one or more embodiments, a seat slide device includes: a lower rail structured to be mounted on a floor of a vehicle, and extend in a longitudinal direction of the vehicle; an upper rail mounted to the lower rail for slide with respect to the lower rail in a longitudinal direction of the lower rail, and structured to mount a seat thereon; and a reinforcing member attached to a rear end part of the upper rail, and extending rearwardly from the rear end part of the upper rail in a longitudinal direction of the upper rail; wherein the lower rail includes: a lower rail body having a U-shaped cross section having an upper opening, and including: a lower rail bottom wall structured to be fixed to the floor of the vehicle; and a pair of lower rail outside lateral walls; a pair of lower rail upper walls each extending inwardly from an upper end of a corresponding one of the lower rail outside lateral walls in a lateral direction of the lower rail; and a pair of lower rail inside lateral walls each extending from an inside end of a corresponding one of the lower rail upper walls toward the lower rail bottom wall; wherein the upper rail includes: an upper rail body having a U-shaped cross section having a lower opening, and including: an upper rail top wall; and a pair of upper rail lateral walls; and a pair of upper rail bent walls each being bent outwardly from a lower end of a corresponding one of the upper rail lateral walls in a lateral direction of the upper rail, and extending upwardly between a corresponding one of the lower rail outside lateral walls and a corresponding one of the lower rail inside lateral walls; and wherein the reinforcing member is higher in rigidity than the upper rail, and includes: a reinforcing member body having a U-shaped cross section having a lower opening, and including: a reinforcing member top wall; and a pair of reinforcing member lateral walls; and a pair of reinforcing member bent wall parts each being bent outwardly from a lower end of a corresponding one of the reinforcing member lateral walls in a lateral direction of the reinforcing member, and extending upwardly between a corresponding one of the lower rail outside lateral walls and a corresponding one of the lower rail inside lateral walls. The seat slide device may be configured such that the reinforcing member bent wall parts are each arranged with a corresponding one of the upper rail bent walls in the longitudinal direction of the upper rail, and each include a lower top end than the corresponding upper rail bent wall. The seat slide device may be configured such that the reinforcing member bent wall parts each include an upward extension that gradually decreases away from the upper rail. The seat slide device may further include a lock mechanism structured to lock the upper rail to the lower rail, wherein: the lower rail inside lateral walls each include lower rail lock teeth arranged in the longitudinal direction of the lower rail, wherein the lower rail lock teeth constitute the lock mechanism; and the reinforcing member bent wall parts of the reinforcing member each have a length such as to overlap with at least two of the lower rail lock teeth in the longitudinal direction of the lower rail. The seat slide device may further include fixing bolts structured to fix the seat to the upper rail top wall, wherein the reinforcing member is fixed to an underside of the upper rail top wall at a position rearward from a rearmost one of the fixing bolts in the longitudinal direction of the upper rail.

DETAILED DESCRIPTION

Figure 8:
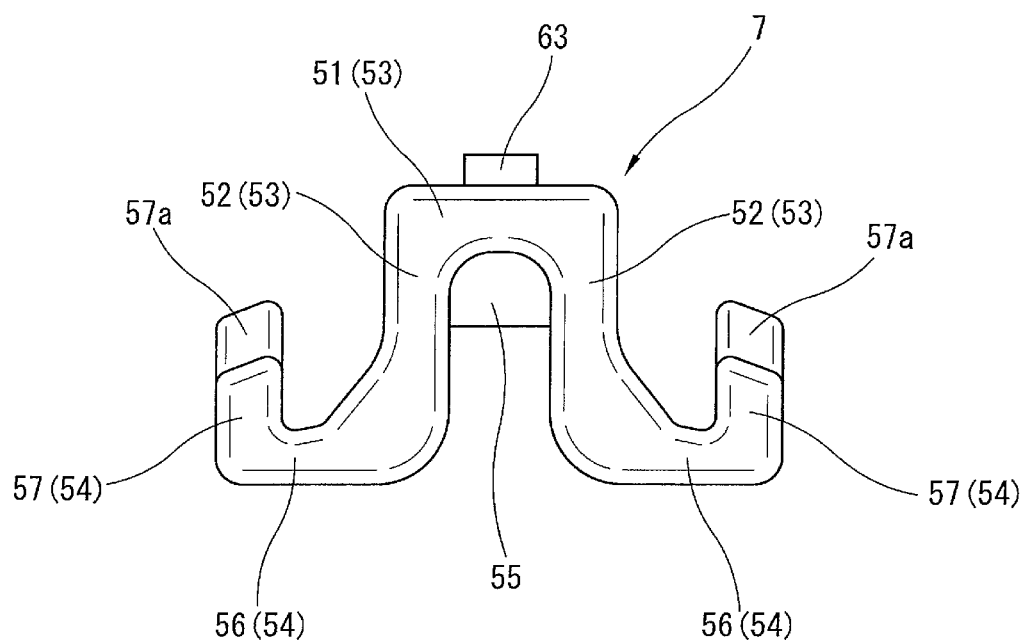
FIG. 8 is a rear view of the reinforcing member according to the first embodiment.
Figure 9:
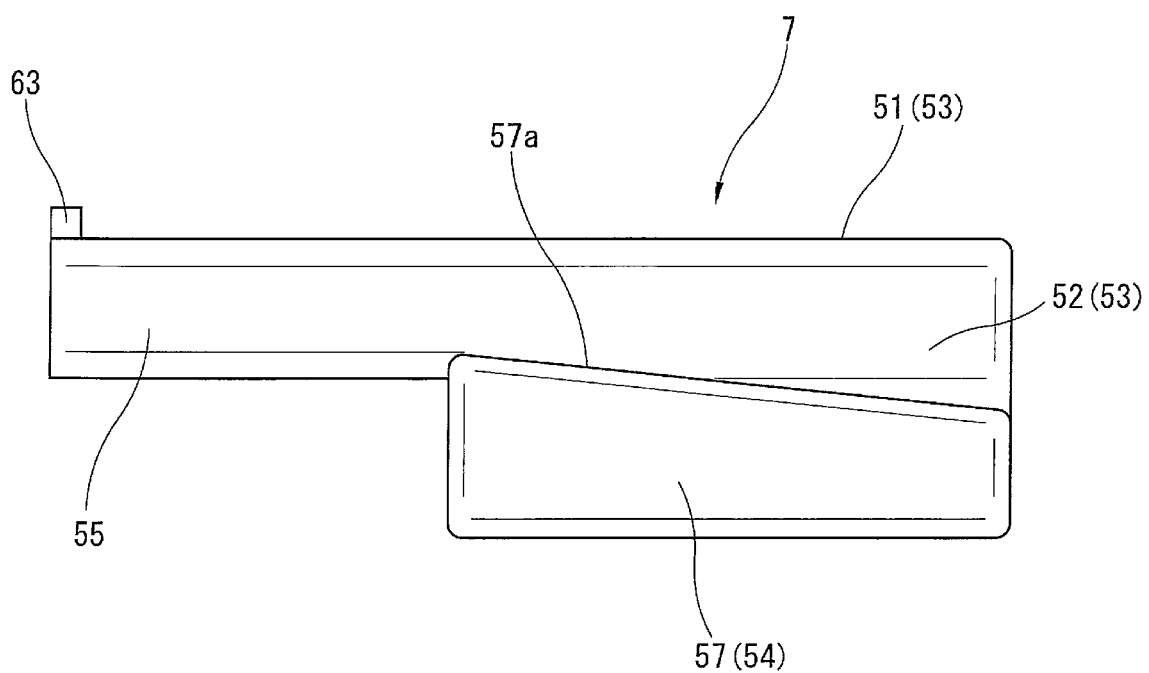
FIG. 9 is a side view of the reinforcing member according to the first embodiment.
Figure 10:
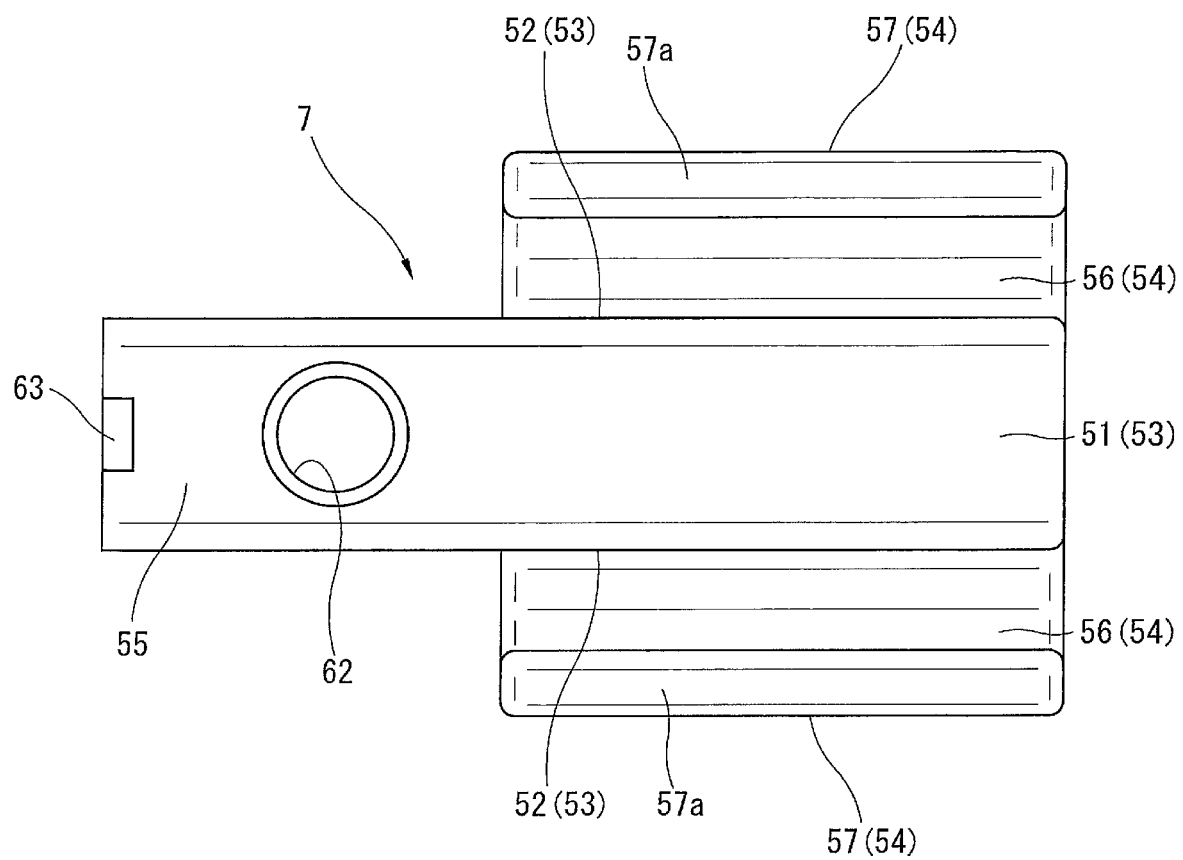
FIG. 10 is a plan view of the reinforcing member according to the first embodiment.
Figure 11:
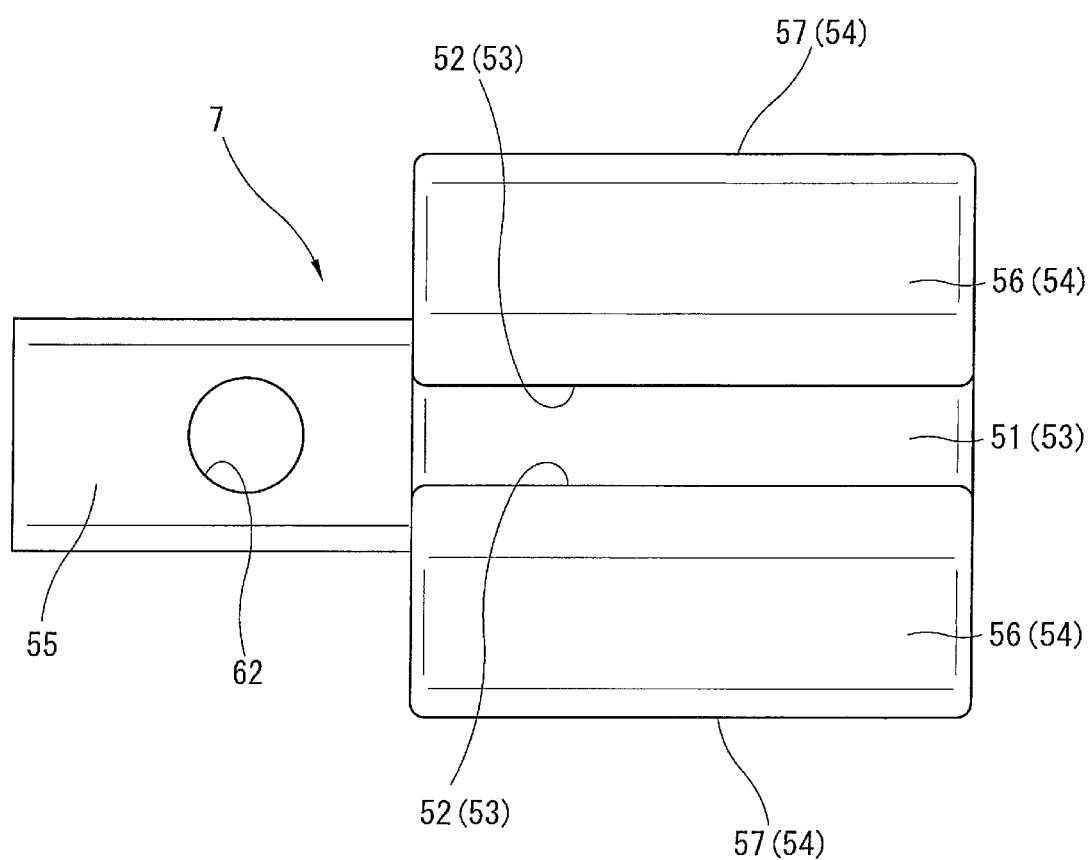
FIG. 11 is a bottom view of the reinforcing member according to the first embodiment.

In the following description, "vertical direction" is a direction of a seat slide device 1 perpendicular to a floor of a vehicle, namely, a direction of height of the vehicle, when the seat slide device 1 is fixed to the floor of the vehicle. The vertical direction of the seat slide device 1 is shown as a vertical direction in each of FIGS. 1 to 4 and 9. In the following description, "longitudinal direction" is a direction of the seat slide device 1 identical to a longitudinal direction of the vehicle, when the seat slide device 1 is fixed to the vehicle. The longitudinal direction of the seat slide device 1 is shown as a horizontal direction in each of FIGS. 1 and 2 where a front side of the seat slide device 1 is on the right side in FIG. 1, and is on the left side in FIG. 2. On the other hand, in each of FIGS. 4, 8 and 12, the longitudinal direction of the seat slide device 1 is a direction perpendicular to the drawing sheet.

Figure 1:
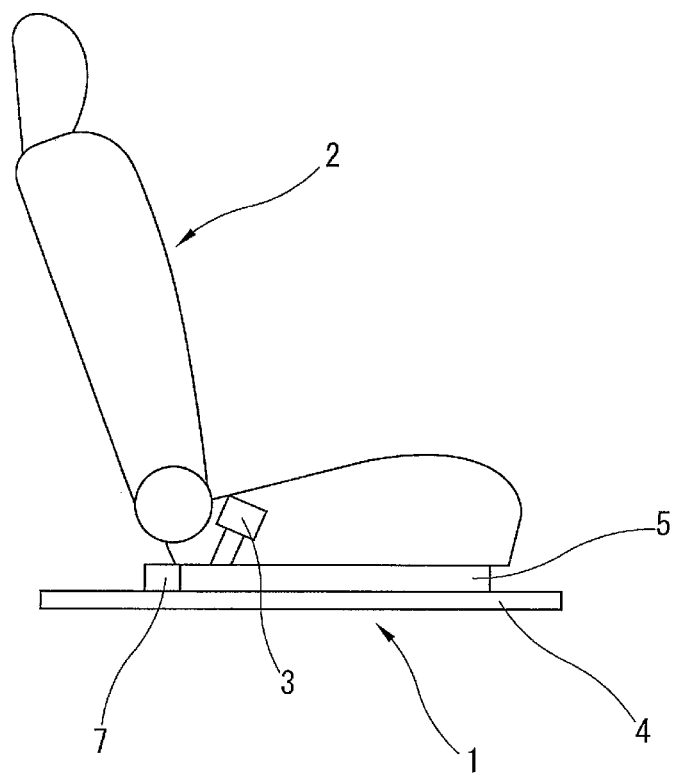
FIG. 1 is a schematic diagram showing a seat slide device according to a first embodiment, which is attached to a seat.

FIGS. 1 to 11 show a first embodiment. As shown in FIG. 1, the seat slide device 1 is attached to an underside of a rear seat as a seat 2, and fixed to the floor of the vehicle. A buckle 3 is fixed to the seat slide device 1, wherein the buckle 3 is structured to be coupled with a tongue plate of a seat belt not shown. The buckle 3 is fixed to a rear end part of an upper rail 5 of the seat slide device 1 in the vehicle longitudinal direction via a bracket not shown.

Figure 2:
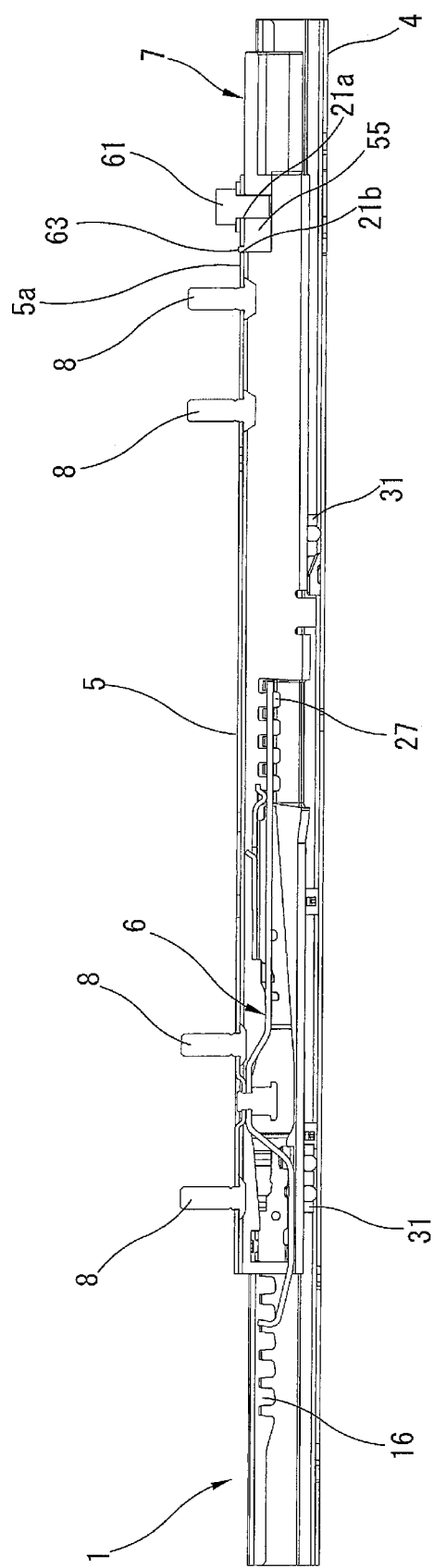
FIG. 2 is a sectional view of the seat slide device according to the first embodiment, taken along a plane extending in a longitudinal direction.
Figure 3:
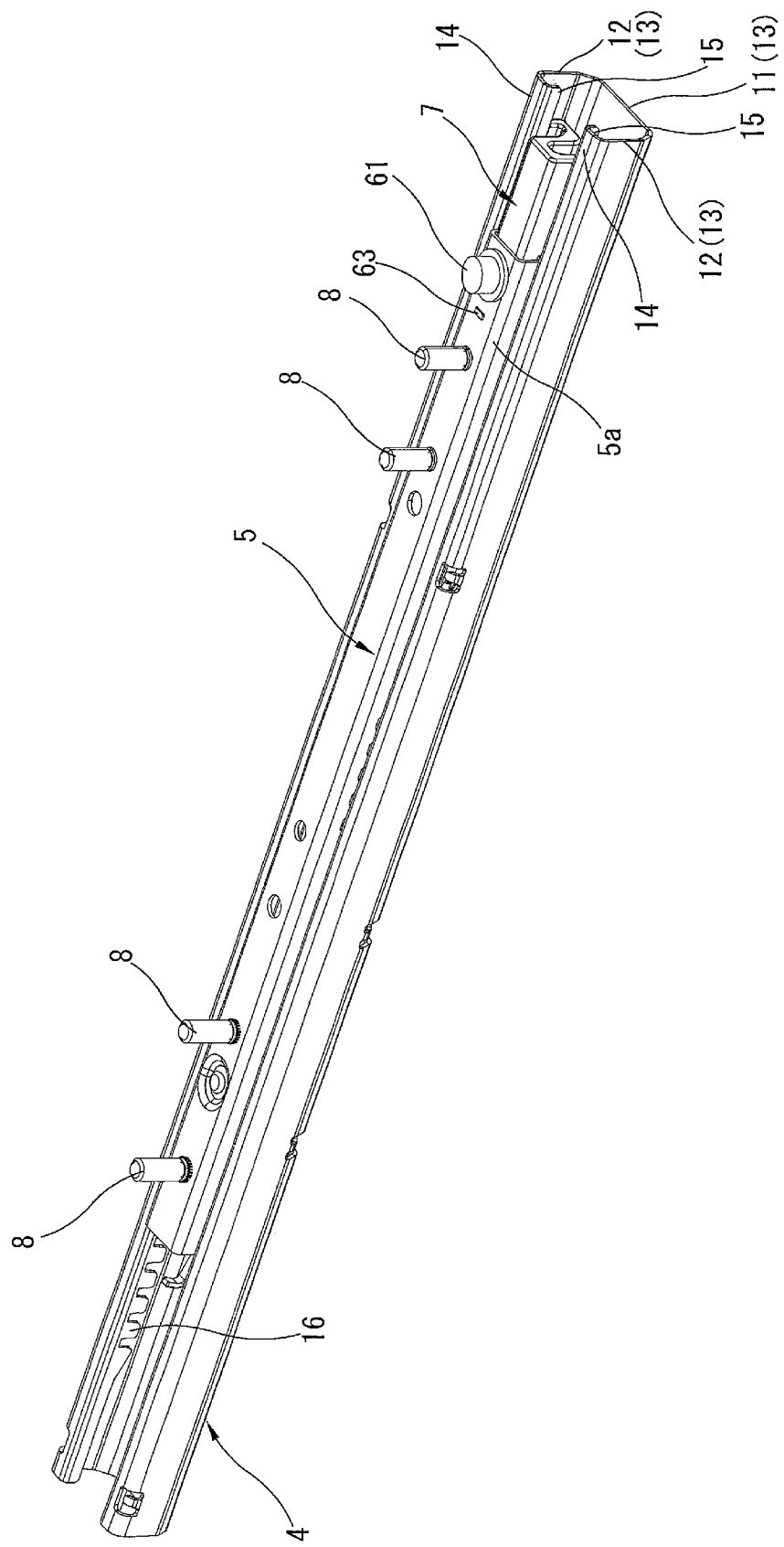
FIG. 3 is a perspective view of the seat slide device according to the first embodiment.

As shown in FIGS. 1 to 3, the seat slide device 1 includes a lower rail 4, the upper rail 5, a lock mechanism 6, and a reinforcing member 7. The lower rail 4 is made of metal, and arranged on the floor, extending in the vehicle longitudinal direction. The upper rail 5 is made of metal, and mounted to the lower rail 4 for slide with respect to the lower rail 4 in the longitudinal direction of the lower rail 4. The lock mechanism 6 is structured to lock the upper rail 5 in an arbitrary position with respect to the lower rail 4. The reinforcing member 7 is made of metal, and attached to the upper rail 5.

The lower rail 4 is formed by bending a steel plate that is a high tension steel plate in this example. Similarly, the upper rail 5 is formed by bending a steel plate that is a high tension steel plate in this example. The reinforcing member 7 is a thicker member than the lower rail 4 and the upper rail 5, and is formed by casting or sintering or by processing a thick steel plate or a steel block in this example. Accordingly, the reinforcing member 7 is higher in rigidity than the lower rail 4 and the upper rail 5.

In the seat slide device 1, a pair of left and right assemblies each prepared by mounting the upper rail 5 and the lock mechanism 6 to the lower rail 4 are arranged in parallel with each other between the seat 2 and the floor, extending in the vehicle longitudinal direction. The left and right assemblies are linked together by an operation handle 43 described below.

The lower rail 4 is set larger in overall length at least than a combination of the upper rail 5 and the reinforcing member 7 when the reinforcing member 7 is attached to a rear end of the upper rail 5, in order to prevent the reinforcing member 7 from projecting with respect to a rear end of the lower rail 4 while the upper rail 5 slides with respect to the lower rail 4. Specifically, even when the upper rail 5 is in a forward end position or in a rearward end position with respect to the lower rail 4, the reinforcing member 7 attached to the rear end of the upper rail 5 does not project outside with respect to the lower rail 4, but constantly remains within the front and rear ends of the lower rail 4 in the vehicle longitudinal direction.

The lower rail 4 is fixed to the floor of the vehicle at front and rear points in the longitudinal direction via respective foot brackets not shown.

Figure 4:
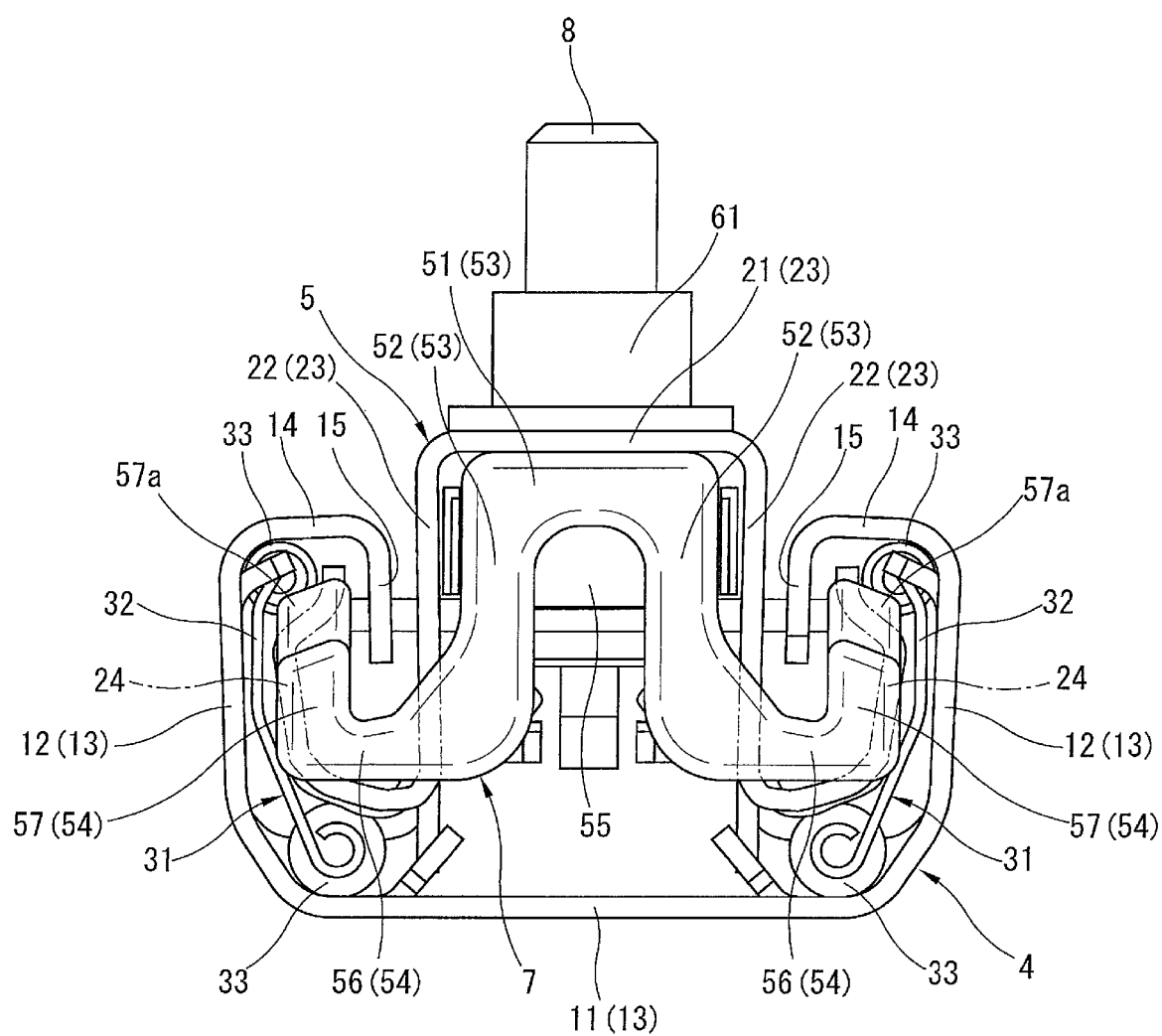
FIG. 4 is a rear view of the seat slide device according to the first embodiment.

As shown in FIGS. 3 and 4, the lower rail 4 includes a lower rail body 13, a pair of lower rail upper walls 14, and a pair of lower rail inside lateral walls 15. The lower rail body 13 has a U-shaped cross section including an upper opening, and includes a lower rail bottom wall 11 and a pair of lower rail outside lateral walls 12. The lower rail bottom wall 11 is fixed to the floor of the vehicle. The lower rail outside lateral walls 12 are respectively on left and right sides of the lower rail bottom wall 11 in a lateral direction of the lower rail 4. Each lower rail upper wall 14 extends inwardly from a top end of the corresponding lower rail outside lateral wall 12 in the lateral direction. Each lower rail inside lateral wall 15 extends from an inside end of the corresponding lower rail upper wall 14 toward the lower rail bottom wall 11 in a vertical direction of the lower rail 4.

As shown in FIGS. 2 and 3, each lower rail inside lateral wall 15 is formed with lower rail lock teeth 16 that constitute the lock mechanism 6. The lower rail lock teeth 16 are arranged in the longitudinal direction of the lower rail 4, like teeth of a comb. For example, the lower rail lock teeth 16 are formed in a region from a front end part to a central part of the lower rail 4.

The spacing between the lower rail inside lateral walls 15 facing each other is set so as to allow slide of the upper rail 5 and the reinforcing member 7 that are mounted to and received in the lower rail 4.

Figure 5:
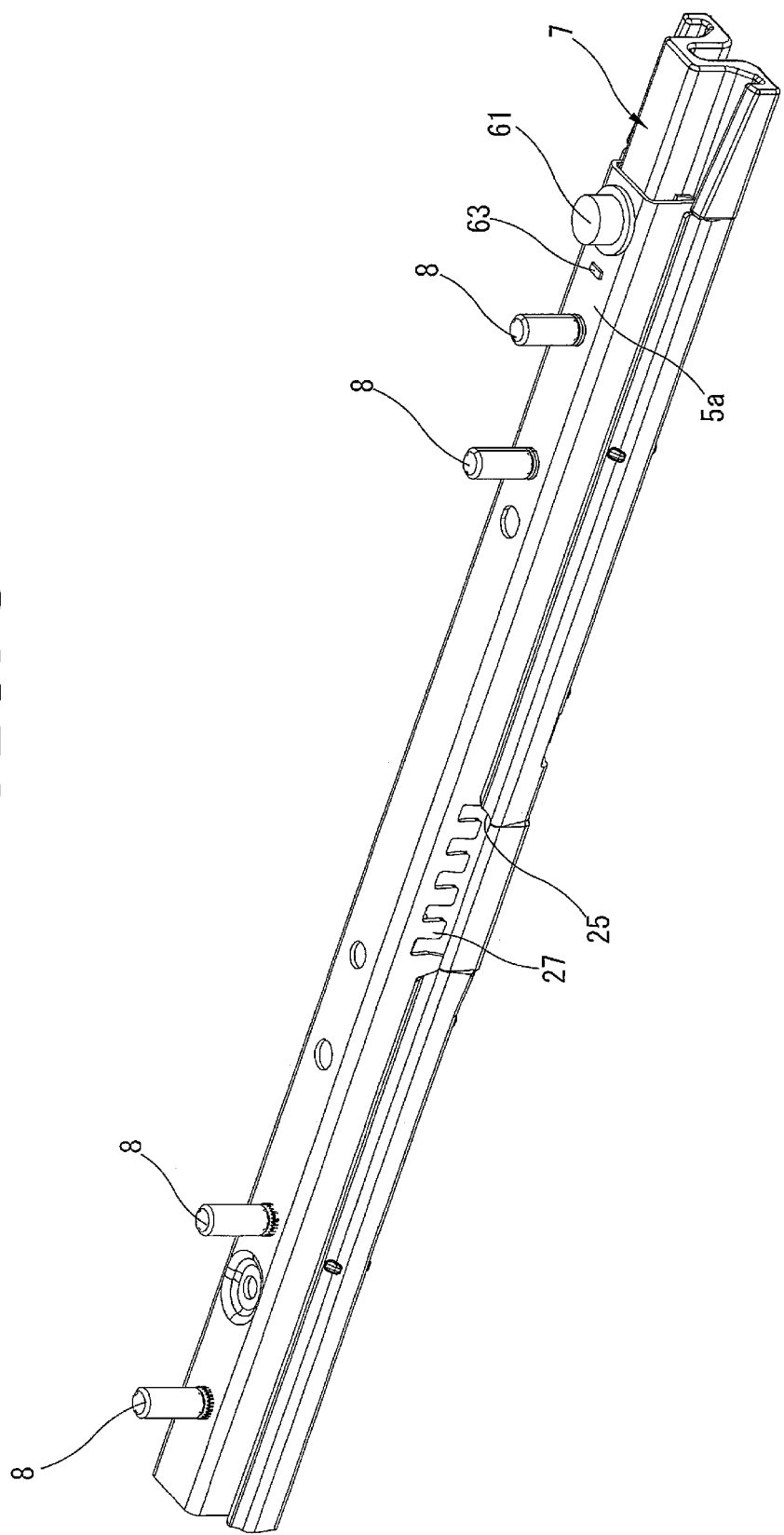
FIG. 5 is a perspective view of an upper rail to which a reinforcing member is attached according to the first embodiment.

As shown in FIGS. 4 and 5, the upper rail 5 includes an upper rail body 23 and a pair of upper rail bent walls 24. The upper rail body 23 has a U-shaped cross section including a lower opening, and includes an upper rail top wall 21 and a pair of upper rail lateral walls 22 on respective sides of the upper rail top wall 21. Each upper rail bent wall 24 is bent outwardly from a lower end of the corresponding upper rail lateral wall 22, extending upwardly.

The upper rail top wall 21 is fixed to the underside of the seat 2 by four fixing bolts 8 shown in FIGS. 2 to 5. Namely, the seat 2 is attached to the upper rail 5. In other words, the seat slide device 1 includes the fixing bolts 8 to fix the seat 2 to the upper rail top wall 21.

As shown in FIGS. 2 and 5, each upper rail lateral wall 22 is formed with upper rail lock teeth 27 in a substantially central part in the longitudinal direction of the upper rail 5. The upper rail lock teeth 27 constitute the lock mechanism 6, as well as the lower rail lock teeth 16.

Each upper rail bent wall 24 has a top end that is inserted between the corresponding lower rail outside lateral wall 12 and the corresponding lower rail inside lateral wall 15 when the upper rail 5 is mounted to the lower rail 4. Simultaneously, the lower rail inside lateral wall 15 is inserted between the corresponding upper rail bent wall 24 and the corresponding upper rail lateral wall 22.

As shown in FIG. 5, each upper rail bent wall 24 is formed with a recessed portion 25 in a substantially central part in the longitudinal direction of the upper rail 5. The upper rail bent wall 24 includes an outwardly expanded part below the recessed portion 25.

As shown in FIG. 4, a pair of slide guide members 31 are provided and each arranged between the lower rail outside lateral wall 12 and the upper rail bent wall 24. Each slide guide member 31 is structured to reduce frictional resistance when the upper rail 5 slides in the lower rail 4. The slide guide member 31 thereby serves to allow the upper rail 5 to slide smoothly with respect to the lower rail 4.

Each slide guide member 31 has a publicly known structure in which a retainer 32 has upper and lower parts each holding steel balls 33. For each of left and right sides, front and rear ones of the slide guide members 31 are arranged within a range where the lower rail 4 and the upper rail 5 overlap with each other.

As shown in FIG. 2, the lock mechanism 6 is composed of the lower rail lock teeth 16 formed in the lower rail 4 and the upper rail lock teeth 27 formed in the upper rail 5.

Figure 6:
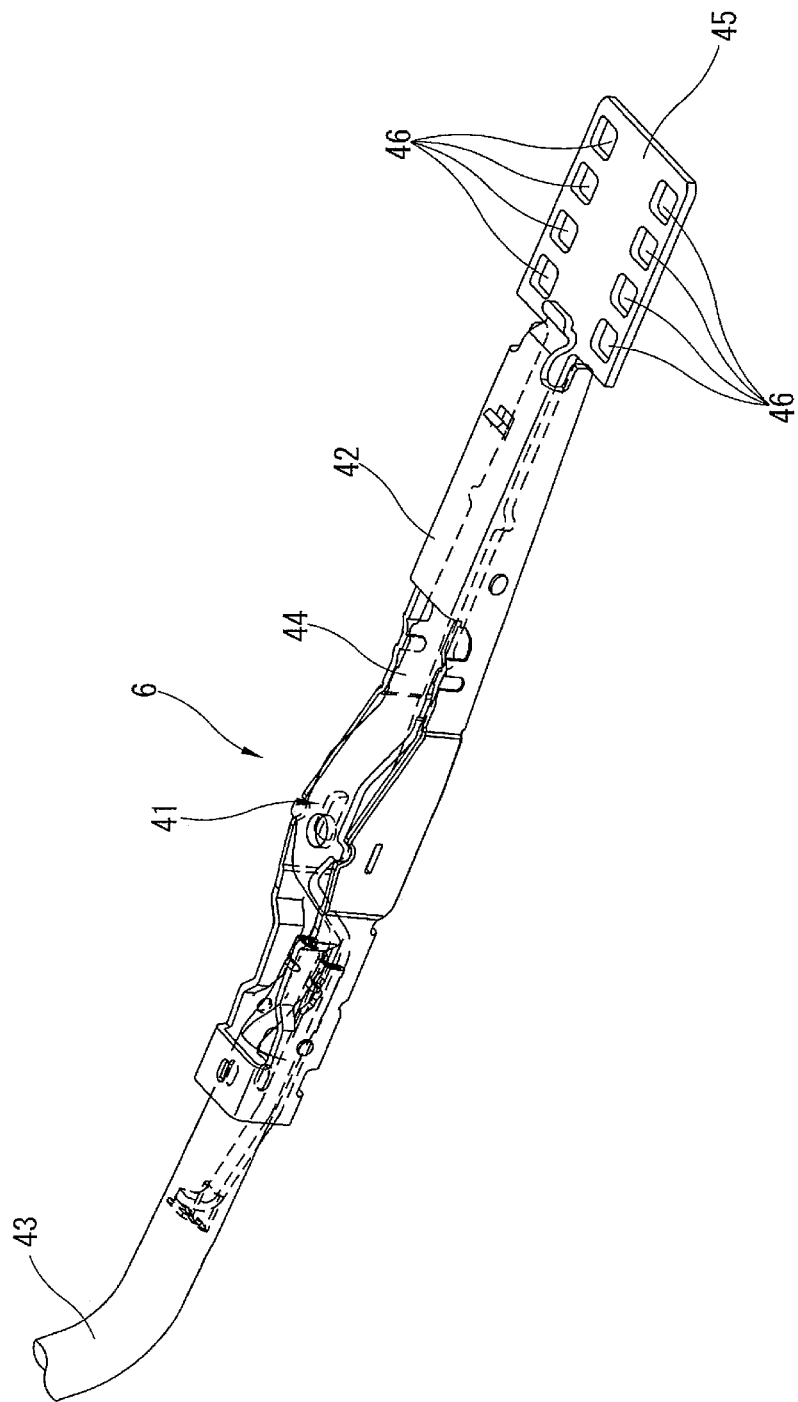
FIG. 6 is an illustrative diagram showing a lock mechanism structured to lock the upper rail in an arbitrary position with respect to a lower rail according to the first embodiment.
Figure 7:
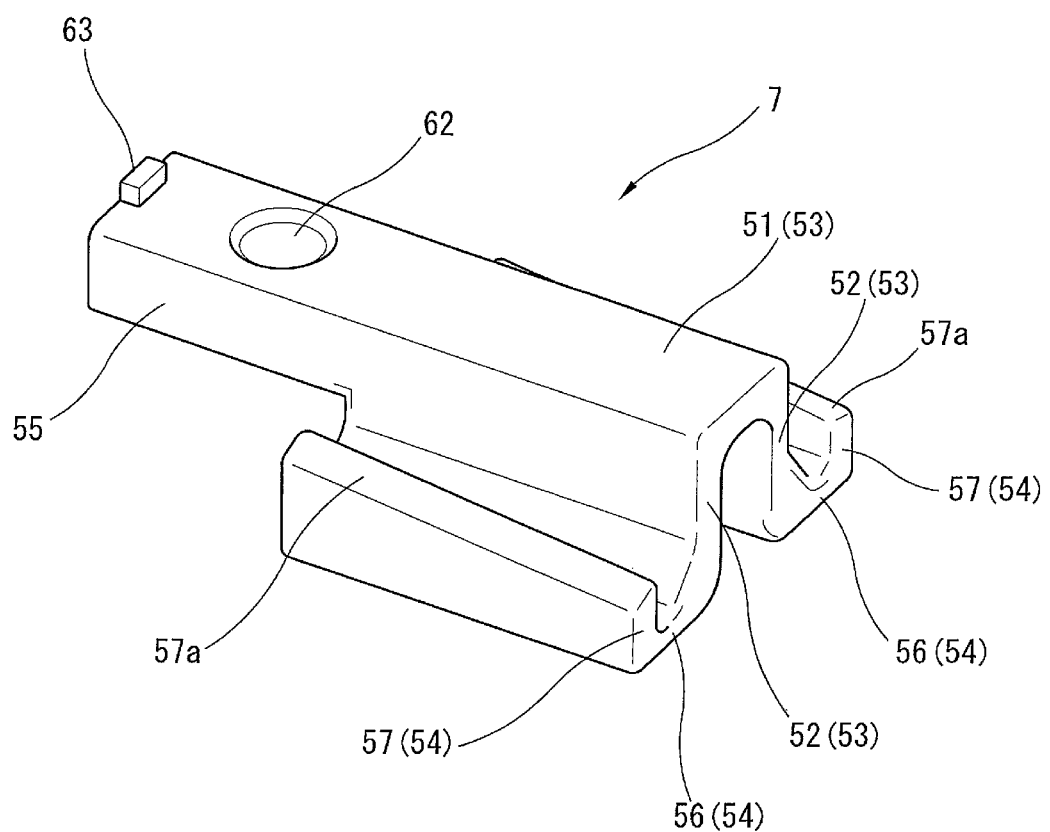
FIG. 7 is a perspective view of the reinforcing member according to the first embodiment.

As shown in FIG. 6, the lock mechanism 6 includes a lock member 41, a release lever 42, and the operation handle 43. The lock member 41 is made of metal, and composed of a plate spring material. The release lever 42 is made of metal, and is structured to cause swinging motion of the lock member 41. The operation handle 43 is coupled with the release lever 42. The lock mechanism 6 is structured as disclosed in Japanese Patent Application Publication No. 2019-163022 (JP 2019-163022 A). The entire contents of JP 2019-163022 A are incorporated herein by reference.

Each lower rail lock tooth 16 serves as a projection formed in the lower rail inside lateral wall 15 of the lower rail 4. Each upper rail lock tooth 27 serves as a projection formed in the substantially central part in the longitudinal direction of the upper rail 5.

The lock member 41 includes a rear side elastically deformed part 44 structured to generate an upward elastic force when the lock member 41 is attached to the upper rail 5.

By the function that the rear side elastically deformed part 44 of the lock member 41 generates an upward elastic force, the lock mechanism 6 maintains a condition that the lower rail lock teeth 16 of the lower rail 4 and the upper rail lock teeth 27 of the upper rail 5 are engaged in lock holes 46 formed in a rear end part 45 of the lock member 41. This condition locks the upper rail 5 with respect to the lower rail 4.

When the operation handle 43 is operated upward, the rear end part 45 of the lock member 41 is pressed downward via the release lever 42 so that the lower rail lock teeth 16 of the lower rail 4 and the upper rail lock teeth 27 of the upper rail 5 get out of the lock holes 46 in the lock mechanism 6. This action brings the upper rail 5 into an unlock state allowing the upper rail 5 to slide with respect to the lower rail 4.

As shown in FIGS. 7 to 11, the reinforcing member 7 includes a reinforcing member body 53, a pair of reinforcing member bent wall parts 54, and a reinforcing member attachment wall 55. The reinforcing member body 53 has a U-shaped cross section including a lower opening, and includes a reinforcing member top wall 51 and a pair of reinforcing member lateral walls 52 on respective sides of the reinforcing member top wall 51. Each reinforcing member bent wall part 54 is bent outwardly from a lower end of the corresponding reinforcing member lateral wall 52, extending upwardly. The reinforcing member attachment wall 55 is a generally rectangular plate projecting from a front end of the reinforcing member top wall 51 in the longitudinal direction of the reinforcing member 7.

The cross section of the reinforcing member 7 formed by the reinforcing member body 53 and the reinforcing member bent wall parts 54 is similar in shape to the cross section of the upper rail 5 formed by the upper rail body 23 and the upper rail bent walls 24.

The reinforcing member body 53 is formed to be thicker than the upper rail body 23, and is thereby higher in rigidity than the upper rail body 23. Specifically, the reinforcing member top wall 51 is thicker than the upper rail top wall 21. Similarly, the reinforcing member lateral walls 52 are thicker than the upper rail lateral walls 22.

Each reinforcing member bent wall part 54 has an L-shaped cross section, including a reinforcing member bottom wall 56 and a reinforcing member outside lateral wall 57. The reinforcing member bottom wall 56 extends outwardly from a lower end of the corresponding reinforcing member lateral wall 52 in the lateral direction. The reinforcing member outside lateral wall 57 extends upwardly from an outside end of the reinforcing member bottom wall 56. The reinforcing member bottom wall 56 and the reinforcing member outside lateral wall 57 are thicker than the upper rail bent wall 24, and are thereby higher in rigidity than the upper rail bent wall 24.

When the upper rail 5 is mounted to the lower rail 4, each reinforcing member bent wall part 54 is inserted between the corresponding lower rail outside lateral wall 12 and the corresponding lower rail inside lateral wall 15. Specifically, when the upper rail 5 is mounted to the lower rail 4, the reinforcing member outside lateral wall 57 of each reinforcing member bent wall part 54 is arranged with the upper rail bent wall 24 in the longitudinal direction of the upper rail 5 (in the vehicle longitudinal direction), and inserted between the corresponding lower rail outside lateral wall 12 and the corresponding lower rail inside lateral wall 15. Simultaneously, each lower rail inside lateral wall 15 is inserted between the corresponding reinforcing member lateral wall 52 and the corresponding reinforcing member outside lateral wall 57.

Each reinforcing member bent wall part 54 is equal in length in the longitudinal direction of the reinforcing member 7 (in the vehicle longitudinal direction) to the reinforcing member lateral walls 52. Specifically, the reinforcing member bottom wall 56 and the reinforcing member outside lateral wall 57 of each reinforcing member bent wall part 54 are equal in length in the longitudinal direction of the reinforcing member 7 (in the vehicle longitudinal direction) to the reinforcing member lateral walls 52.

Each reinforcing member bent wall part 54 has an upward extension (or vertical size) that gradually increases toward the reinforcing member attachment wall 55 in the longitudinal direction of the reinforcing member 7 (in the vehicle longitudinal direction). Specifically, the reinforcing member outside lateral wall 57 of each reinforcing member bent wall part 54 has an upward extension (or vertical size) that gradually increases toward the reinforcing member attachment wall 55 in the longitudinal direction of the reinforcing member 7 (in the vehicle longitudinal direction). In other words, each reinforcing member bent wall part 54 is formed to have an upward extension (or vertical size) that gradually decreases away from the upper rail 5 in the longitudinal direction of the reinforcing member 7 (in the vehicle longitudinal direction). Specifically, the reinforcing member outside lateral wall 57 of each reinforcing member bent wall part 54 has an upper end face 57a that is inclined with respect to the longitudinal direction of the reinforcing member 7 (in the vehicle longitudinal direction) such that the upward extension of the reinforcing member outside lateral wall 57 gradually decreases away from the upper rail 5 in the longitudinal direction of the reinforcing member 7 (in the vehicle longitudinal direction).

The reinforcing member attachment wall 55 is inserted in the upper rail 5, and fixed to the underside of the upper rail top wall 21 by a screw member 61 as shown in FIGS. 2 to 5. The screw member 61 is inserted in a through hole 21a formed in the upper rail top wall 21 as shown in FIG. 2.

The reinforcing member attachment wall 55 is thicker than the reinforcing member top wall 51. The reinforcing member attachment wall 55 is equal in width to the reinforcing member top wall 51 in the lateral direction. The reinforcing member attachment wall 55 extends from a front end of the reinforcing member top wall 51, and is parallel to the reinforcing member top wall 51, so that the the reinforcing member attachment wall 55 has a top face flush with the top face of the reinforcing member top wall 51.

The reinforcing member attachment wall 55 is formed with a reinforcing member through hole 62 and a reinforcing member protrusion 63. The screw member 61 is inserted in the reinforcing member through hole 62 so as to fix the reinforcing member 7 to the upper rail 5. The reinforcing member protrusion 63 is inserted in an engagement hole 21*b* of the upper rail top wall 21 as shown in FIG. 2.

The reinforcing member through hole 62 is formed in a substantially central part of the reinforcing member attachment wall 55 in the longitudinal direction of the reinforcing member 7. The reinforcing member through hole 62 is an internally-threaded hole, and is engaged with an externally threaded outer periphery of the screw member 61. Alternatively, the reinforcing member attachment wall 55 may be formed to have the same thickness as the reinforcing member top wall 51, and provided with a nut at the underside of the reinforcing member attachment wall 55 which overlaps with the reinforcing member through hole 62, and the screw member 61 may be screwed in the nut, thereby fixing the reinforcing member 7 to the upper rail 5.

The reinforcing member protrusion 63 is formed in a top face of a front end portion of the reinforcing member attachment wall 55 in the longitudinal direction of the reinforcing member 7. The reinforcing member protrusion 63 serves to position the reinforcing member 7 and prevent rotation of the reinforcing member 7 with respect to the upper rail 5. Insertion of the reinforcing member protrusion 63 in the engagement hole 21*b* serves to facilitate an operation of attaching the reinforcing member 7 to the upper rail 5 as specified, and ensure the fixation of the reinforcing member 7 to the upper rail 5 as specified.

Each reinforcing member bent wall part 54 of the reinforcing member 7 has a length such as to overlap with at least two of the lower rail lock teeth 16 in the longitudinal direction of the reinforcing member 7 (in the vehicle longitudinal direction). Specifically, the reinforcing member bottom wall 56 of each reinforcing member bent wall part 54 of the reinforcing member 7 has a length such as to overlap with at least two of the lower rail lock teeth 16 in the longitudinal direction of the reinforcing member 7 (in the vehicle longitudinal direction). Namely, in the longitudinal direction of the reinforcing member 7, the length of each reinforcing member bottom wall 56 is large enough to prevent concentration of a load from the upper rail 5 on one of the lower rail lock teeth 16 when a rear end part 5*a* of the upper rail 5 is deformed upward.

When a shock load is applied to the seat slide device 1 forward in the vehicle longitudinal direction (forward in the seat longitudinal direction), and a large load acts on the vehicle on the upper rail 5 in a diagonally forward and upward direction via the buckle 3 coupled with the seat belt, the load is concentrated on the portion of the upper rail 5 where the fixing bolt 8 closer to the rear end of the upper rail 5 is positioned, so that the upper rail 5 is about to deform and the rear end part 5*a* of the upper rail 5 is about to be raised upward. Under this situation, in the upper rail 5, the lower end of each upper rail lateral wall 22 is about to deform inwardly in the lateral direction, and the top end of each upper rail bent wall 24 is about to be inclined outwardly in the lateral direction. On the other hand, in the lower rail 4, the upper end of each lower rail outside lateral wall 12 is about to be inclined outwardly in the lateral direction, and each lower rail inside lateral wall 15 is about to be raised and inclined outwardly.

However, the seat slide device 1 includes the reinforcing member 7 that is attached to the end part (the rear end part 5*a* on the rear side of the rearmost fixing bolt 8) of the upper rail 5, wherein the reinforcing member 7 is higher in rigidity than the upper rail 5 while the reinforcing member 7 is similar in shape to the upper rail 5. Namely, the seat slide device 1 includes the highly rigid reinforcing member 7 at the rear end part 5*a* of the upper rail 5 that is subject to a large load when the upper rail 5 deforms such that the rear end part 5*a* of the upper rail 5 is raised. This feature serves to suppress deformation of the rear end part 5*a* of the upper rail 5, and since the direction of the load acting from the reinforcing member bent wall part 54 of the reinforcing member 7 onto the lower rail upper wall 14 of the lower rail 4 is stable, suppress the raised and outwardly inclined deformation of the lower rail inside lateral wall 15, and thereby enhance the resistance against detachment between the upper rail 5 and the lower rail 4.

The above feature serves to reinforce the structure with a reduced number of additional components, without upsizing of the whole seat slide device 1.

Furthermore, the seat slide device 1 is structured such that the front end face of the reinforcing member bent wall part 54 that is arranged with the upper rail bent wall 24 in the longitudinal direction of the upper rail 5 (in the vehicle longitudinal direction) contacts the upper rail lateral wall 22 and the upper rail bent wall 24 of the upper rail 5 so that the reinforcing member 7 suppresses the upper rail 5 from deforming into a substantially inverted-V shape. This makes it possible to simplify the structure for fixing the reinforcing member 7 to the upper rail 5.

Since the reinforcing member bent wall part 54 serves to suppress the lower rail inside lateral wall 15 from being raised and inclined outwardly, the upper rail bent wall 24 is suppressed from contacting the lower rail inside lateral wall 15 and being inclined outwardly to deform the upper rail 5. In other words, the provision of the highly rigid reinforcing member 7 in the seat slide device 1 serves to enhance the resistance against detachment between the upper rail 5 and the lower rail 4, and suppress the upper rail 5 from being detached from the lower rail 4 when the upper rail 5 is deformed and raised upwardly.

The resistance against detachment between the upper rail 5 and the lower rail 4 can be adjusted by varying the length of the reinforcing member body 53 of the reinforcing member 7. The resistance against detachment between the upper rail 5 and the lower rail 4 increases with 1*s* increase in the length of the reinforcing member body 53 in the longitudinal direction of the reinforcing member 7. Therefore, the upper rail 5 of the seat slide device 1 may be set to have common specifications for various requests for resistance against detachment between the upper rail 5 and the lower rail 4.

As described above, the reinforcing member bent wall part 54 of the reinforcing member 7 is formed to have the upward extension that gradually decreases away from the upper rail 5 in the longitudinal direction of the upper rail 5. When the rear end side of the upper rail 5 is deformed and raised, this feature serves to suppress concentration of the load on the rear end part of the reinforcing member 7, and disperse the load, which is applied from the reinforcing member 7 to the lower rail upper wall 14, in the longitudinal direction of the lower rail 4, and thereby suppress deformation of the lower rail 4. The reinforcing member 7 is fixed to the underside of the upper rail top wall 21 by the screw member 61 on the rear side of the rearmost fixing bolt 8.

As described above, the reinforcing member 7 is formed such that that the reinforcing member bent wall part 54 has a length such as to overlap with at least two of the lower rail lock teeth 16 in the longitudinal direction of the lower rail 4. With this feature of the seat slide device 1, when the upper rail 5 is deformed upwardly, the tip end of each lower rail lock tooth 16 contacts the reinforcing member bent wall part 54 so that the load from the reinforcing member 7 can be dispersed and received by the lower rail 4. In this way, the resistance against detachment between the upper rail 5 and the lower rail 4 is enhanced.

Under the condition that the reinforcing member 7 is attached to the upper rail 5, the top end of the reinforcing member bent wall part 54 is positioned lower than the top end of the upper rail bent wall 24 over the entire range in the longitudinal direction of the reinforcing member 7 as shown in FIG. 4. Namely, under the condition that the reinforcing member 7 is attached to the upper rail 5, the top end of the reinforcing member bent wall part 54 at its end closer to the reinforcing member attachment wall 55 in the longitudinal direction of the reinforcing member 7 is positioned lower than the top end of the upper rail bent wall 24. Specifically, under the condition that the reinforcing member 7 is attached to the upper rail 5, the top end (upper end face 57*a*) of the reinforcing member outside lateral wall 57 is positioned lower than the top end of the upper rail bent wall 24 over the entire range in the longitudinal direction of the reinforcing member 7. With this feature of the seat slide device 1, when the rear end part 5*a* of the upper rail 5 is deformed upward, the top end of the upper rail bent wall 24 first contacts the lower rail upper wall 14. When the rear end part 5*a* is further deformed upward, the top end of the reinforcing member bent wall part 54 (reinforcing member outside lateral wall 57) contacts the lower rail upper wall 14.

Since the reinforcing member 7 is fixed to the 1*o* underside of the upper rail top wall 21 by the screw member 61 on the rear side of the rearmost fixing bolt 8, when the rear end part 5*a* of the upper rail 5 is deformed upward, the upper rail 5 contacts the lower rail upper wall 14 under the condition that the portion close to the rear end (the portion where the rearmost fixing bolt 8 is positioned) of the upper rail 5 forms an apex with the front and rear sides of that portion positioned lower than the apex in the vertical direction. This feature serves to reliably prevent concentration of the load on the rear end of the reinforcing member 7 when the rear end part 5*a* of the upper rail 5 is deformed upward. Namely, this feature serves to disperse the stress to the front and rear sides of the rear end portion of the upper rail 5 when the rear end part 5*a* of the upper rail 5 is deformed upward. This also serves to enhance the resistance against detachment between the upper rail 5 and the lower rail 4.

Figure 12:
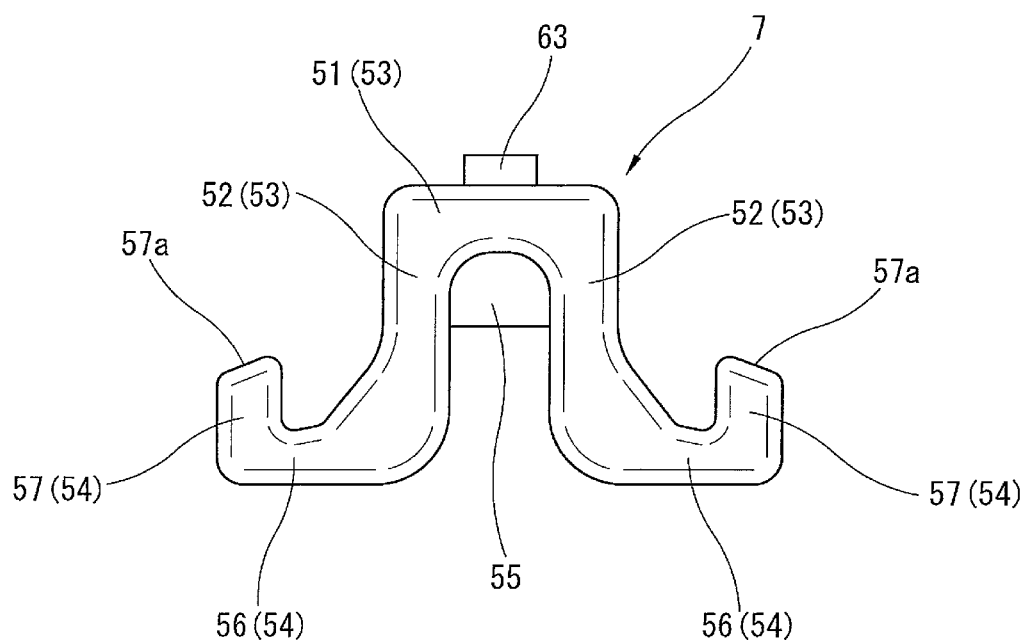
FIG. 12 is a rear view of a reinforcing member according to a second embodiment.
Figure 13:
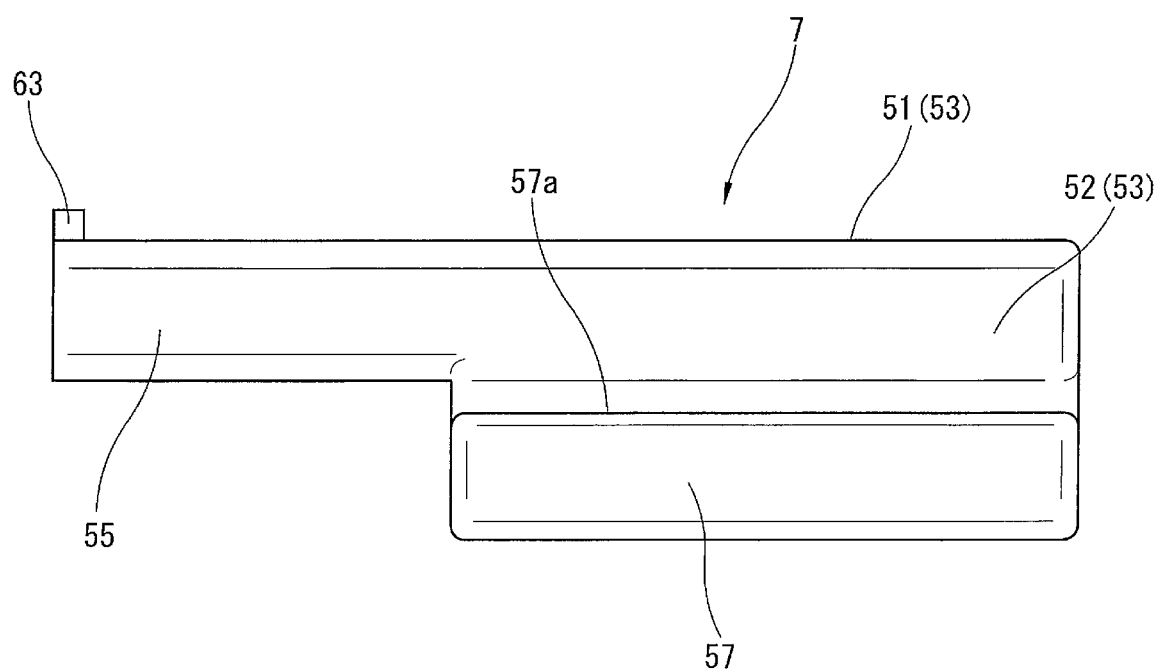
FIG. 13 is a side view of the reinforcing member according to the second embodiment.

FIGS. 12 and 13 show a reinforcing member 7 according to a second embodiment. As shown in FIGS. 12 and 13, the reinforcing member bent wall part 54 is formed to have an upward extension that is constant over the entire range in the longitudinal direction, in contrast to the structure according to the first embodiment. This structure also serves to produce the effect of dispersing the stress to the lower rail 4, because the reinforcing member 7 is fixed to the underside of the upper rail top wall 21 by the screw member 61 on the rear side of the rearmost fixing bolt 8, and when the rear end part 5*a* of the upper rail 5 is deformed upward, the upper rail 5 takes an inverted-V shape with an apex being the portion close to the rear end of the upper rail 5 (the portion of the upper rail 5 where the rearmost fixing bolt 8 is positioned). In other words, in the second embodiment, the upper end face 57*a* of the reinforcing member outside lateral wall 57 is parallel to the reinforcing member top wall 51 and the reinforcing member bottom wall 56.

In summary, a seat slide device (1) includes: a lower rail (4) structured to be mounted on a floor of a vehicle, and extend in a longitudinal direction of the vehicle; an upper rail (5) mounted to the lower rail (4) for slide with respect to the lower rail (4) In a longitudinal direction of the lower rail (4), and structured to mount a seat (2) thereon; and a reinforcing member (7) attached to a rear end part (5*a*) of the upper rail (5), and extending rearwardly from the rear end part (5*a*) of the upper rail (5) in a longitudinal direction of the upper rail (5); wherein the lower rail (4) includes: a lower rail body (13) having a U-shaped cross section having an upper opening, and including: a lower rail bottom wall (11) structured to be fixed to the floor of the vehicle; and a pair of lower rail outside lateral walls (12); a pair of lower rail upper walls (14) each extending inwardly from an upper end of a corresponding one of the lower rail outside lateral walls (12) in a lateral direction of the lower rail (4); and a pair of lower rail inside lateral walls (15) each extending from an inside end of a corresponding one of the lower rail upper walls (14) toward the lower rail bottom wall (11); wherein the upper rail (5) includes: an upper rail body (23) having a U-shaped cross section having a lower opening, and including: an upper rail top wall (21); and a pair of upper rail lateral walls (22); and a pair of upper rail bent walls (24) each being bent outwardly from a lower end of a corresponding one of the upper rail lateral walls (22) in a lateral direction of the upper rail (5), and extending upwardly between a corresponding one of the lower rail outside lateral walls (12) and a corresponding one of the lower rail inside lateral walls (15); and wherein the reinforcing member (7) is higher in rigidity than the upper rail (5), and includes: a reinforcing member body (53) having a U-shaped cross section having a lower opening, and including: a reinforcing member top wall (51); and a pair of reinforcing member lateral walls (52); and a pair of reinforcing member bent wall parts (54) each being bent outwardly from a lower end of a corresponding one of the reinforcing member lateral walls (52) in a lateral direction of the reinforcing member (7), and extending upwardly between a corresponding one of the lower 2*s* rail outside lateral walls (12) and a corresponding one of the lower rail inside lateral walls (15). The reinforcing member bent wall parts (54) are each arranged with a corresponding one of the upper rail bent walls (24) in the longitudinal direction of the upper rail (5), and each include a lower top end than the corresponding upper rail bent wall (24). The reinforcing member bent wall parts (54) each include an upward extension that gradually decreases away from the upper rail (5). The seat slide device (1) further includes a lock mechanism (6) structured to lock the upper rail (5) to the lower rail (4), wherein: the lower rail inside lateral walls (15) each include lower rail lock teeth (16) arranged in the longitudinal direction of the lower rail (4), wherein the lower rail lock teeth (16) constitute the lock mechanism (6); and the reinforcing member bent wall parts (54) of the reinforcing member (7) each have a length such as to overlap with at least two of the lower rail lock teeth (16) In the longitudinal direction of the lower rail (4). The seat slide device (1) further includes fixing bolts (8) structured to fix the seat (2) to the upper rail top wall (21), wherein the reinforcing member (7) is fixed to an underside of the upper rail top wall (21) at a position rearward from a rearmost one of the fixing bolts (8) in the longitudinal direction of the upper rail (5).

The entire contents of Japanese Patent Application 2020-008831 filed Jan. 23, 2020 are incorporated herein by reference.

Although the invention has been described above by reference to certain embodiments of the invention, the invention is not limited to the embodiments described above. Modifications and variations of the embodiments described above will occur to those skilled in the art in light of the above teachings. The scope of the invention is defined with reference to the following claims.

The invention claimed is:

1. A seat slide device comprising:
a lower rail structured to be mounted on a floor of a vehicle, and structured to extend in a longitudinal direction of the vehicle;
an upper rail mounted to the lower rail for slide with respect to the lower rail in a longitudinal direction of the lower rail, and structured to mount a seat thereon; and
a reinforcing member attached to a rear end part of the upper rail, and extending rearwardly from the rear end part of the upper rail in a longitudinal direction of the upper rail;
wherein the lower rail includes:
a lower rail body having a U-shaped cross section having an upper opening, and including:
a lower rail bottom wall structured to be fixed to the floor of the vehicle, and
a pair of lower rail outside lateral walls,
a pair of lower rail upper walls each extending inwardly from an upper end of a corresponding one of the lower rail outside lateral walls in a lateral direction of the lower rail, and
a pair of lower rail inside lateral walls each extending from an inside end of a corresponding one of the lower rail upper walls toward the lower rail bottom wall;
wherein the upper rail includes:
an upper rail body having a U-shaped cross section having a lower opening, and including:
an upper rail top wall, and
a pair of upper rail lateral walls, and
a pair of upper rail bent walls each being bent outwardly from a lower end of a corresponding one of the upper rail lateral walls in a lateral direction of the upper rail, and extending upwardly between a corresponding one of the lower rail outside lateral walls and a corresponding one of the lower rail inside lateral walls; and
wherein the reinforcing member is higher in rigidity than the upper rail, and includes:
a reinforcing member body having a U-shaped cross section having a lower opening, and including:
a reinforcing member top wall, and
a pair of reinforcing member lateral walls, and
a pair of reinforcing member bent wall parts each being bent outwardly from a lower end of a corresponding one of the reinforcing member lateral walls in a lateral direction of the reinforcing member, and extending upwardly between a corresponding one of the lower rail outside lateral walls and a corresponding one of the lower rail inside lateral walls,
wherein:
the reinforcing member is fixed to the upper rail top wall,
the reinforcing member bent wall parts are each arranged with a corresponding one of the upper rail bent walls in the longitudinal direction of the upper rail, and each include a lower uppermost end in a vertical direction of the upper rail than the corresponding one of the upper rail bent walls,
the reinforcing member bent wall parts each have a front end face structured to contact a rear end face of the corresponding one of the upper rail bent walls when the rear end part of the upper rail deforms upwardly in the vertical direction of the upper rail, and
the reinforcing member bent wall parts each include an upward extension having a tapered shape with a height that decreases as the upward extension extends away from the upper rail in the longitudinal direction of the upper rail.

2. The seat slide device as claimed in claim 1, further comprising a lock mechanism structured to lock the upper rail to the lower rail, wherein:
the lower rail inside lateral walls each include lower rail lock teeth arranged in the longitudinal direction of the lower rail, wherein the lower rail lock teeth of each of the lower rail inside lateral walls constitute the lock mechanism, and
the reinforcing member bent wall parts of the reinforcing member each have a length such as to overlap with at least two of the lower rail lock teeth of a corresponding one of the lower rail inside lateral walls in the longitudinal direction of the lower rail.

3. The seat slide device as claimed in claim 1, further comprising fixing bolts structured to fix the seat to the upper rail top wall, wherein the reinforcing member is fixed to an underside of the upper rail top wall at a position rearward from a rearmost one of the fixing bolts in the longitudinal direction of the upper rail.

4. A seat slide device comprising:
a lower rail structured to be mounted on a floor of a vehicle, and structured to extend in a longitudinal direction of the vehicle;
an upper rail mounted to the lower rail for slide with respect to the lower rail in a longitudinal direction of the lower rail, and structured to mount a seat thereon; and
a reinforcing member attached to a rear end part of the upper rail, and extending rearwardly from the rear end part of the upper rail in a longitudinal direction of the upper rail;
wherein the lower rail includes:
a lower rail body having a U-shaped cross section having an upper opening, and including:
a lower rail bottom wall structured to be fixed to the floor of the vehicle, and
a pair of lower rail outside lateral walls;
a pair of lower rail upper walls each extending inwardly from an upper end of a corresponding one of the lower rail outside lateral walls in a lateral direction of the lower rail, and
a pair of lower rail inside lateral walls each extending from an inside end of a corresponding one of the lower rail upper walls toward the lower rail bottom wall;
wherein the upper rail includes:
an upper rail body having a U-shaped cross section having a lower opening, and including:
an upper rail top wall, and
a pair of upper rail lateral walls, and
a pair of upper rail bent walls each being bent outwardly from a lower end of a corresponding one of the upper rail lateral walls in a lateral direction of the upper rail, and extending upwardly between a corresponding one of the lower rail outside lateral walls and a corresponding one of the lower rail inside lateral walls; and wherein the reinforcing member is higher in rigidity than the upper rail, and includes:
- a reinforcing member body having a U-shaped cross section having a lower opening, and including:
  - a reinforcing member top wall, and
  - a pair of reinforcing member lateral walls,
- a pair of reinforcing member bent wall parts each being bent outwardly from a lower end of a corresponding one of the reinforcing member lateral walls in a lateral direction of the reinforcing member, and extending upwardly between a corresponding one of the lower rail outside lateral walls and a corresponding one of the lower rail inside lateral walls, and
- a reinforcing member attachment wall being a substantially rectangular plate projecting from a front end of the reinforcing member top wall in a longitudinal direction of the reinforcing member, wherein:
- the reinforcing member is fixed to the upper rail top wall in a manner such that the reinforcing member attachment wall is inserted in the upper rail, and is fixed to an underside of the upper rail top wall by a screw member, wherein the screw member is inserted in a through hole formed in the upper rail top wall, and wherein the reinforcing member attachment wall is an only part of the reinforcing member that overlaps with the upper rail in the longitudinal direction of the upper rail,
- the reinforcing member bent wall parts are each arranged with a corresponding one of the upper rail bent walls in the longitudinal direction of the upper rail, and each include a lower uppermost end in a vertical direction of the upper rail than the corresponding one of the upper rail bent walls,
- the reinforcing member bent wall parts each have a front end face structured to get into contact with a rear end face of the corresponding one of the upper rail bent walls so as to suppress deformation of the reinforcing member with respect to the upper rail into a substantially inverted-V shape, in response to upward deformation of the rear end part of the upper rail in the vertical direction of the upper rail, and
- the seat slide device further comprises a lock mechanism structured to lock the upper rail to the lower rail, wherein:
  - the lower rail inside lateral walls each include lower rail lock teeth arranged in the longitudinal direction of the lower rail, wherein the lower rail lock teeth of each of the lower rail inside lateral walls constitute the lock mechanism, and
  - the reinforcing member bent wall parts of the reinforcing member each have a length such as to overlap with at least two of the lower rail lock teeth of a corresponding one of the lower rail inside lateral walls in the longitudinal direction of the lower rail.

5. The seat slide device as claimed in claim 4, further comprising fixing bolts structured to fix the seat to the upper rail top wall, wherein the reinforcing member attachment wall of the reinforcing member is fixed to the underside of the upper rail top wall at a position rearward from a rearmost one of the fixing bolts in the longitudinal direction of the upper rail.

6. The seat slide device as claimed in claim 4, wherein:
- the reinforcing member attachment wall includes a reinforcing member through hole;
- the screw member is inserted in the reinforcing member through hole so as to fix the reinforcing member to the upper rail; and
- the reinforcing member through hole is an internally-threaded hole, and is engaged with an externally threaded outer periphery of the screw member.

7. The seat slide device as claimed in claim 4, wherein the lower rail is set larger in overall length than a combination of the upper rail and the reinforcing member, in order to prevent the reinforcing member from projecting with respect to a rear end of the lower rail while the upper rail slides with respect to the lower rail.

* * * * *